(No Model.)　　　　　　　　　　　　　　　　2 Sheets—Sheet 1.
C. ZIMMER.
PROCESS OF BREWING BEER.
No. 330,184.　　　　　　　　　　　　Patented Nov. 10, 1885.

Witnesses:
Col. N. Rosenbaum.
Otto Risch.

Inventor:
Conrad Zimmer
by Goepel & Raegener,
Attorneys.

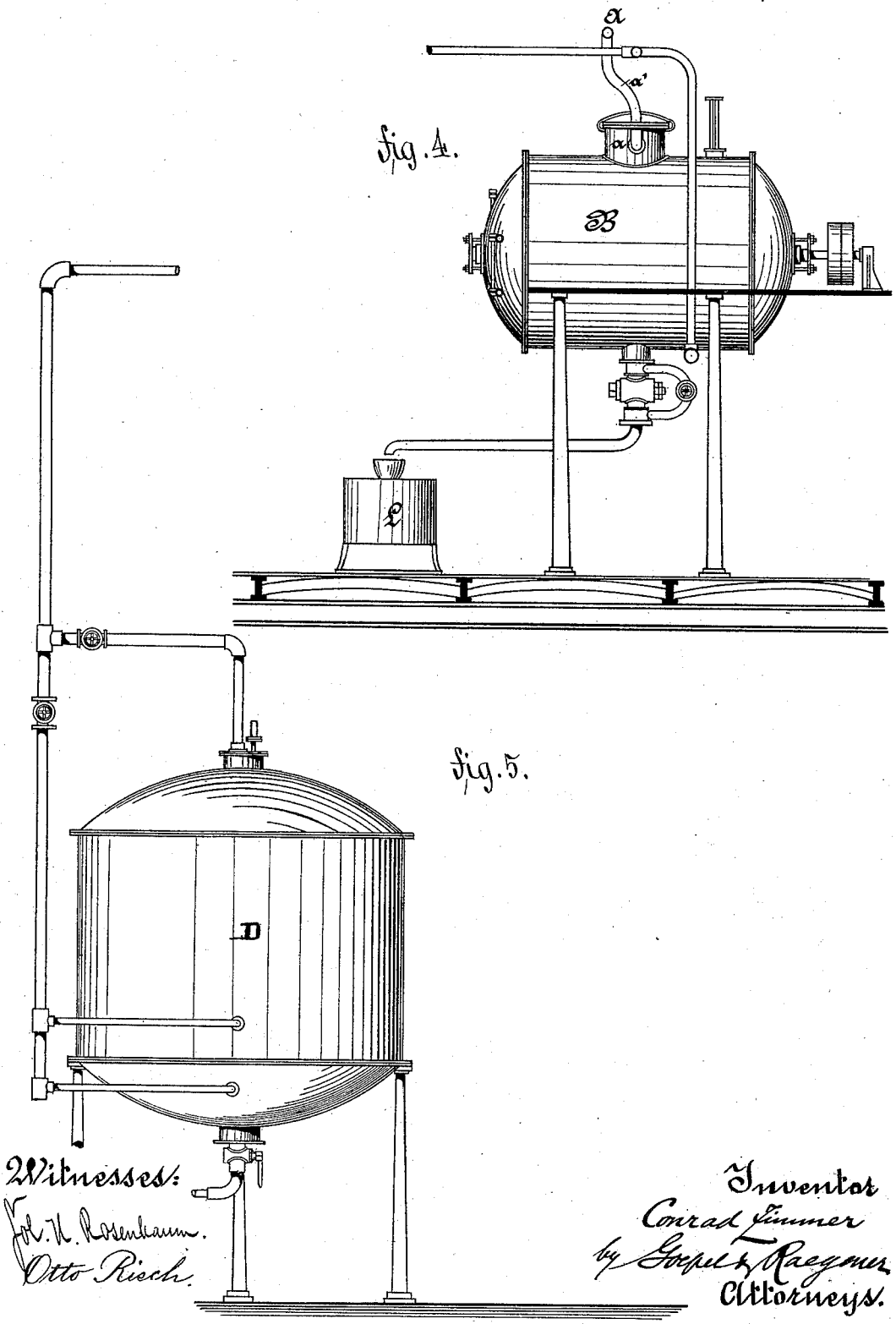

United States Patent Office.

CONRAD ZIMMER, OF FRANKFORT-ON-THE-MAIN, ASSIGNOR TO THE ACTIEN GESELLSCHAFT ZUR EINFÜHRUNG TECHNISCHER NEUHEITEN, OF BERLIN, GERMANY.

PROCESS OF BREWING BEER.

SPECIFICATION forming part of Letters Patent No. 330,184, dated November 10, 1885.

Application filed October 27, 1883. Serial No. 110,188. (No model.) Patented in Germany November 15, 1882, No. 23,412; in France February 9, 1883, No. 153,616; in Belgium February 22, 1883, No. 60,526; in Italy March 31, 1883, XXX, 437; in Austria-Hungary April 21, 1883, No. 738 and No. 759; in Spain November 7, 1883, No. 4,781; in England April 15, 1884, No. 6,393; in Sweden July 15, 1884; in Norway August 12, 1884, and in Denmark September 1, 1884, No. 755.

*To all whom it may concern:*

Be it known that I, CONRAD ZIMMER, a resident of the city of Frankfort-on-the-Main, in the Empire of Germany, have invented certain new and useful Improvements in a Process of Brewing Beer, (for which Letters Patent have heretofore been granted to me by the government of Belgium, No. 60,526, dated March 15, 1883,) of which the following is a specification.

The invention consists in a process of brewing beer which consists in subjecting finely-ground malt from which the hulls and germs have been removed and water to the saccharification temperature, then boiling the mash a sufficient length of time to coagulate the albuminous substances and render the same insoluble, then separating the clear wort from the insoluble substances, then directly passing the mash into a centrifugal machine for separating the clear wort from the insoluble substance by centrifugal force, and finally conducting the clear wort to a hop-kettle and boiling it therein.

Figure 1:
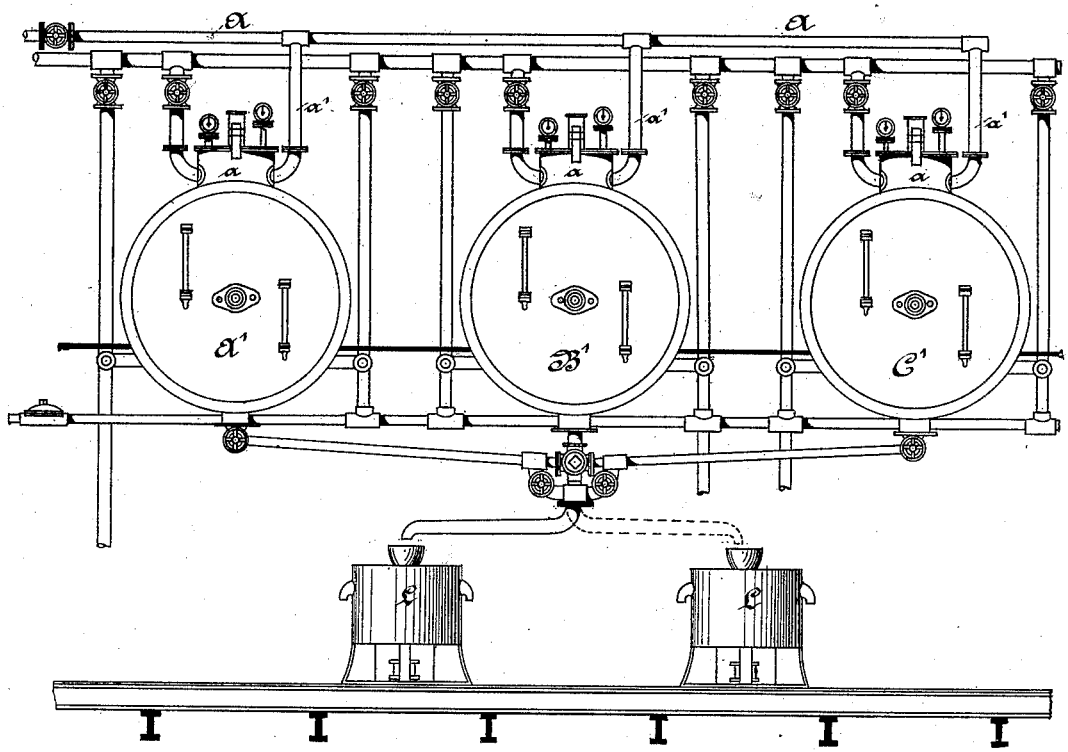
Figure 2:
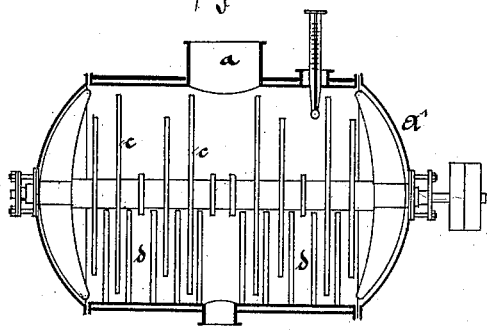
Figure 3:
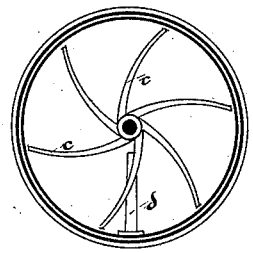

In the accompanying drawings, Figure 1 represents a front elevation of the mashing-drums and centrifugal machines connected thereto. Fig. 2 is a vertical longitudinal, and Fig. 3 a transverse section, of the mashing-drums. Fig. 4 is a side elevation of Fig. 1, and Fig. 5 is a side elevation of a hop-boiler and its connections.

Similar letters indicate corresponding parts.

In carrying out my improved process the malt is ground into meal, and all such parts thereof as are not required in the brewing process are separated by any suitable sifting or winnowing devices. The parts of the malt removed and not required in the brewing process are the hulls and germs and the bacteria adhering to the hulls, which if allowed to remain would exert an injurious influence. At the same time the greater portion of the albuminous matters are removed, since the same are not necessary in the saccharification process, do not serve to give the beer its peculiar character, and are not required for feeding the yeast, but serve solely to make the beer easily decomposable. For this reason I remove all such parts in the malt-reducing mill or process, and obtain not only a pure raw product, but a final resultant in the nature of a beer which surpasses in its keeping properties, purity of taste, and frothiness beers made by other processes. The malt-meal prepared in the above-described manner is mashed with water of ordinary temperature in a closed drum in partial vacuum and under continuous agitation, while the mash is heated to the saccharification temperature and retained at this temperature for about one hour. The mash is then heated to a boiling temperature for about one hour, whereby the albuminous substances contained therein are coagulated and rendered insoluble, and then the temperature of the mash is lowered to 75° centigrade, at which temperature it is drawn off into a centrifugal machine of proper construction. By virtue of the removal of the hulls from the malt no settlement or long standing in the mash-boiler is required, and after the termination of the boiling operation and lowering to the proper temperature the mash can speedily be subjected to centrifugal force. By this centrifugal machine the clear wort is separated from the insoluble substances, which are present in the wort only in the form of coagulated flakes, thus facilitating the action of the centrifugal machine, and not rendering the same liable to clog or fill up in a very short time, as would be the result if the hulls, germs, and other unnecessary matters had not been removed from the active agents of the malt by a preparatory cleaning process. The insoluble albuminous substances separated in this manner contain only a very small percentage of moisture, while the wort which is drawn off from the centrifugal machine is of perfectly clear and bright appearance. The wort is then introduced into the hop-kettle and boiled, and in practice I draw the wort directly from the centrifugal machine into the hop-kettle.

The apparatus shown in the drawings is used for admitting the continuous working of the process, and it consists of three mashing-drums, A' B' C', which are provided with supply-openings a and covers for hermetically closing the same. The malt-meal is mixed with cold water in a sparger, and then run into the drums, the proportion of water being such that an easily-flowing mash of dough-like consistency is obtained. The drum A' is first filled with mash, and then tightly closed. The mash is then heated by admitting between the jacketed walls of the drum steam or other heating agents. During this portion of the process the temperature of the mash is so regulated that it is never raised to such a degree that the destruction of the diastase can take place. The vapors are drawn off by the evacuation-pipes a' A and an approved vacuum apparatus of any known construction. The mash is retained about an hour at the so-called "saccharification temperature," and after the lapse of that time is raised to the boiling-point and maintained at that point for about one hour, whereby the albuminous substances are caused to coagulate, after which the heat is reduced to the saccharification temperature, and then the mash is drawn off by a valved connecting-pipe, C, to the centrifugal machine L. By this machine the clear wort is separated from the insoluble substances, including the coagulated albuminous substances, and it is then drawn off through a connecting-pipe into the hop-boiler D, which latter is made large enough so that it can receive the contents of two mashing-drums.

For making the operation continuous, the second mashing-drum, B', is charged with malt-meal and water while the mash in the first drum, A', is boiling, the mash in the second drum, B', being treated in the same manner as the mash in the drum A'. As soon as the mash in the drum B' arrives at the boiling-stage mash is introduced into the third drum, C', so that when the wort from the drum A' has been separated from its insoluble substances in the centrifugal machine the mash in the second drum, B', is ready for being drawn off for separation in the centrifugal machine, and the clear wort is also drawn off into the hop-boiler. The hop-boiler, which has thus received the contents of two mashing-drums, is thus entirely filled two hours after the beginning of the centrifugal action with a concentrated wort, to which the proper quantity of water is added until the desired degree of strength is obtained. While the wort from the two first mashing-drums is boiled in the hop-kettle the contents of the two following mashing-drums are drawn off into a second hop-kettle, so that the contents of the first kettle can be drawn off for further treatment. The two hop-kettles are thus alternately filled with a clear wort from the mashing-drums and centrifugal machines. The mashing-drums are provided in their interior with a revolving shaft having curved radial stirrer-arms c, which latter pass between fixed vertical arms d. The inclined surfaces of the stirrer-arms c force the mash in opposite direction toward the ends of the drums, whereby an intimate mixing of the meal with the water is secured.

The advantages of my improved process are that in this manner not only the operations of mashing, separating, and boiling with the hops can be continuously carried on, but also that clear wort of uniform quality and, consequently, a uniform quality of beer are obtained.

I am aware that malt has been ground and deprived of the sharps, pollards, and bran, and used in brewing beer, but such idea separately considered forms no part of my invention. Neither do I wish to claim the broad idea of separating the solid and liquid portions of brewers' mashes by centrifugal force, as this has already been done by others.

Having thus described my invention, what I claim as new, and desire to secure by Letters Patent, is—

The improved process of brewing beer, which consists in depriving malt of its hulls and germs, then subjecting it with water to the saccharification temperature, then boiling the mash a sufficient length of time to coagulate the albuminous substances and render the same insoluble, then directly conducting the mash into a centrifugal machine for separating the clear wort from the insoluble substances, and finally passing the clear wort to a hop-kettle and boiling the same therein, substantially as herein set forth.

In testimony that I claim the foregoing as my invention I have signed my name in presence of two subscribing witnesses.

CONRAD ZIMMER.

Witnesses:
EMIL CAPITAINE,
B. ROI.